United States Patent
Park et al.

(10) Patent No.: US 9,632,796 B2
(45) Date of Patent: Apr. 25, 2017

(54) COMPUTING APPARATUS AND METHOD FOR CONTROLLING AUTOMATIC BOOTING WHEN COVER IS OPENED

(71) Applicant: LG ELECTRONICS INC., Seoul (KR)

(72) Inventors: Junghoon Park, Seoul (KR); Gwiro Lee, Seoul (KR)

(73) Assignee: LG ELECTRONICS, INC., Seoul (KR)

( * ) Notice: Subject to any disclaimer, the term of this patent is extended or adjusted under 35 U.S.C. 154(b) by 248 days.

(21) Appl. No.: 14/584,717

(22) Filed: Dec. 29, 2014

(65) Prior Publication Data

US 2015/0227377 A1    Aug. 13, 2015

(30) Foreign Application Priority Data

Feb. 12, 2014   (KR) ........................ 10-2014-0016026

(51) Int. Cl.
```
G06F 9/445      (2006.01)
G06F 9/44       (2006.01)
G06F 1/16       (2006.01)
```
(52) U.S. Cl.
CPC .......... *G06F 9/4401* (2013.01); *G06F 1/1616* (2013.01); *G06F 9/4418* (2013.01)

(58) Field of Classification Search
CPC .... G06F 1/3218; G06F 1/3265; G06F 9/4401; G06F 9/4418; G06F 9/44505
See application file for complete search history.

(56) References Cited

U.S. PATENT DOCUMENTS

2006/0090085 A1    4/2006  McKenney et al.
2006/0139326 A1*   6/2006  Tsukamoto ........... G06F 1/1616
                                                       345/158

(Continued)

FOREIGN PATENT DOCUMENTS

WO    WO 2010/027375 A1    3/2010

OTHER PUBLICATIONS

Anonymous, "Fast Startup—Turn On or Off in Windows 8," Windows EightForums, May 20, 2012, 8 pages, XP055195331.

(Continued)

*Primary Examiner* — Albert Wang
(74) *Attorney, Agent, or Firm* — Birch, Stewart, Kolasch & Birch, LLP

(57) ABSTRACT

A computing apparatus and a method for controlling the same are disclosed. According to an exemplary embodiment of the present invention, the method for controlling the computing apparatus includes the steps of receiving a user command configured to turn on an automatic booting mode through a user interface unit, delivering data corresponding to an ON state of the automatic booting mode to a BIOS module from an application module having an operating system stored therein, storing a configuration value corresponding to the ON state of the automatic booting mode in a Read-Only Memory (ROM) section of the BIOS module, when the cover is in a closed state, detecting an opening of the cover, and performing a predetermined operation in accordance with the configuration value being stored in the ROM section of the BIOS module, based upon a system status corresponding to when the cover is in a closed state.

20 Claims, 11 Drawing Sheets

(56) References Cited

U.S. PATENT DOCUMENTS

2013/0007496 A1* 1/2013 Tamura ................ G06F 1/1677
713/323
2013/0159690 A1* 6/2013 Tsukamoto ............... G06F 1/26
713/2

OTHER PUBLICATIONS

Anonymous, "Opening Laptop Lid Starts Windows 8," Windows EightForums, Nov. 25, 2012, 2 pages, XP055195414.
Shultz, "How Windows 8 Hybrid Shutdown / Fast Boot Feature Works," techrepublic.com blog online, Oct. 24, 2013, 6 pages, XP055125616.

* cited by examiner

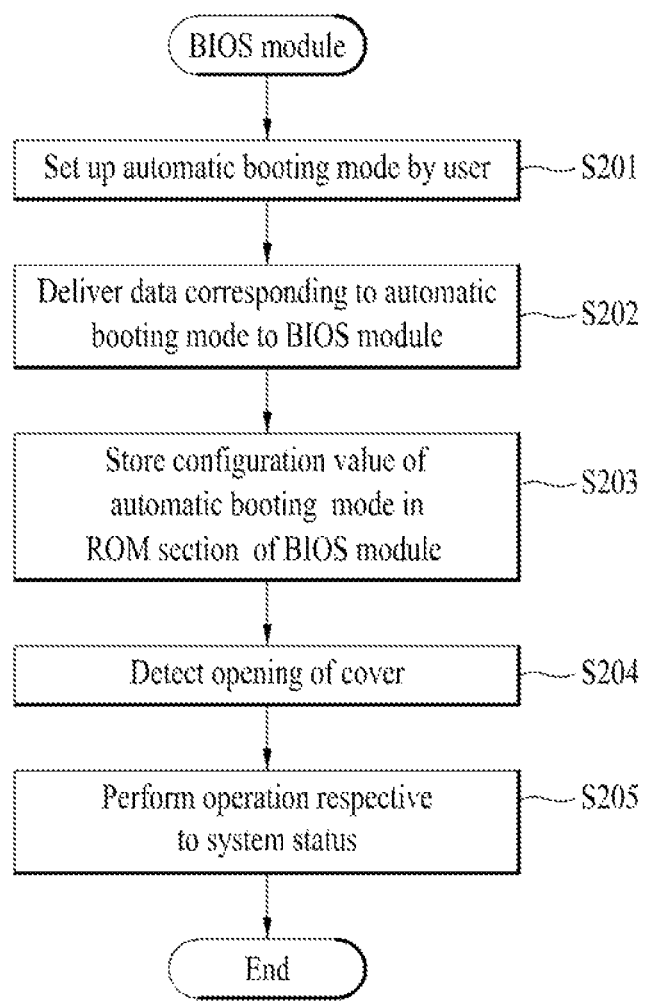

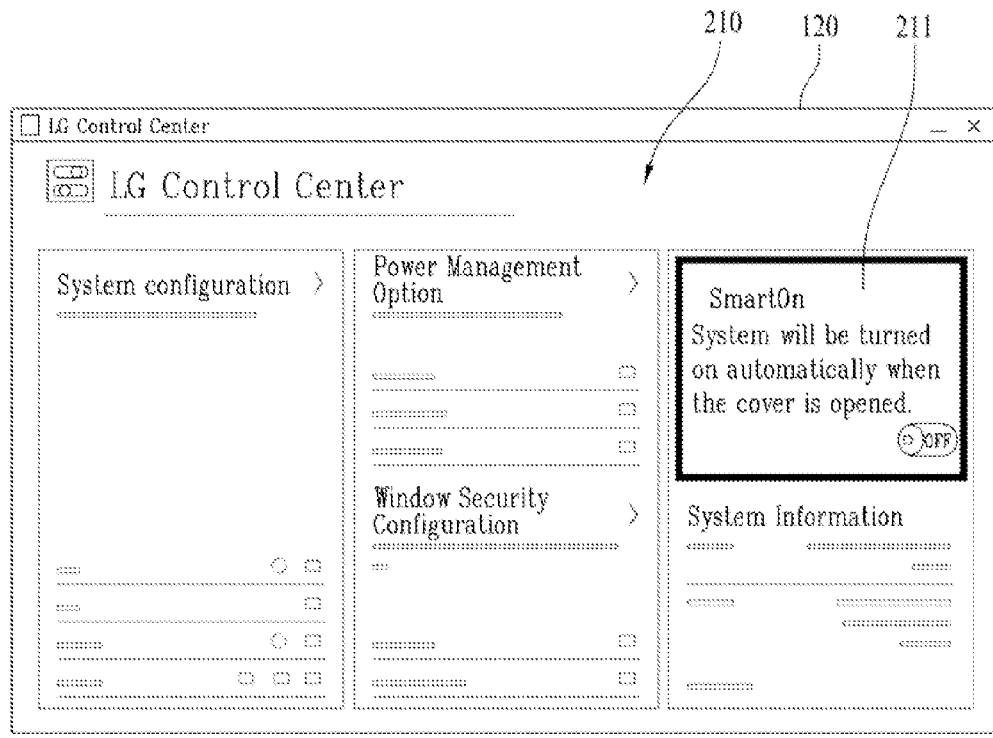

| System Status | Operation(Operation initiated when cover is open) |
|---|---|
| S0 | Only the display panel is turned ON and no other operation is performed. |
| S3 | Enter S0 state. |
| S4 | Enter S0 state. |
| S5 | Initiate booting process. |

FIG. 12
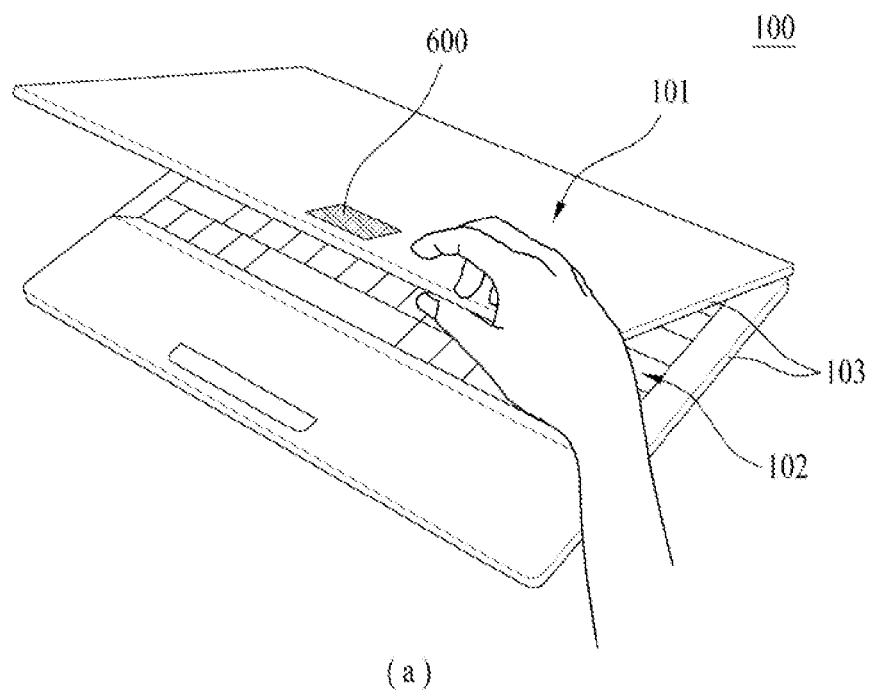
(a)
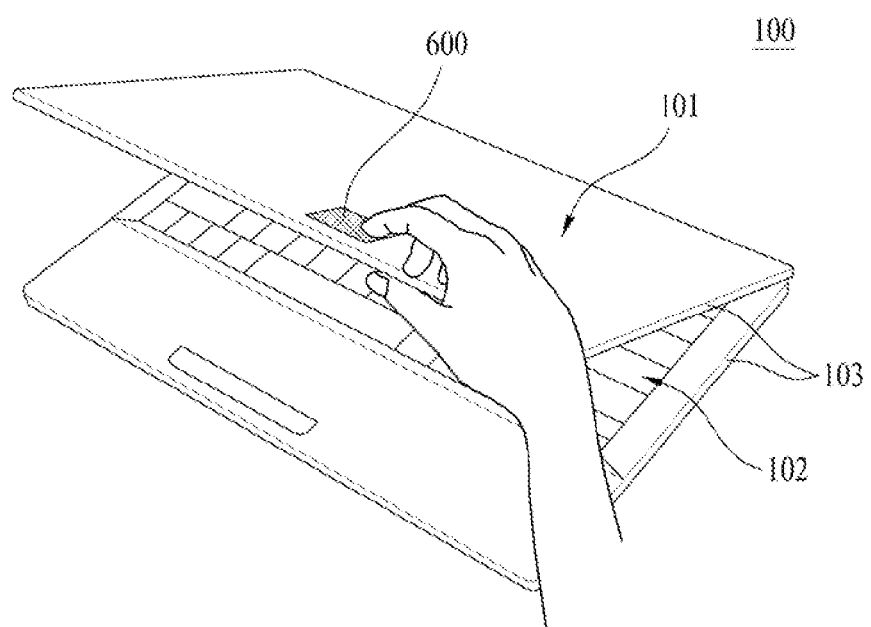
(b)

FIG. 13
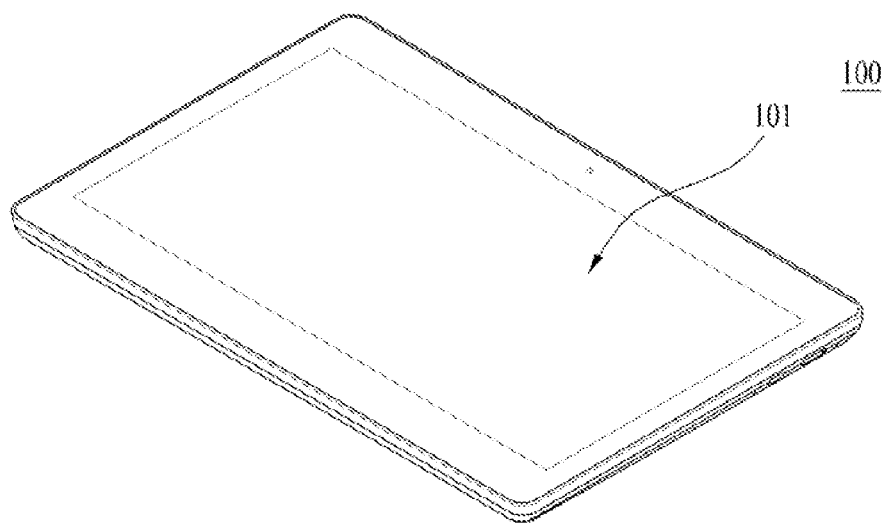
(a)
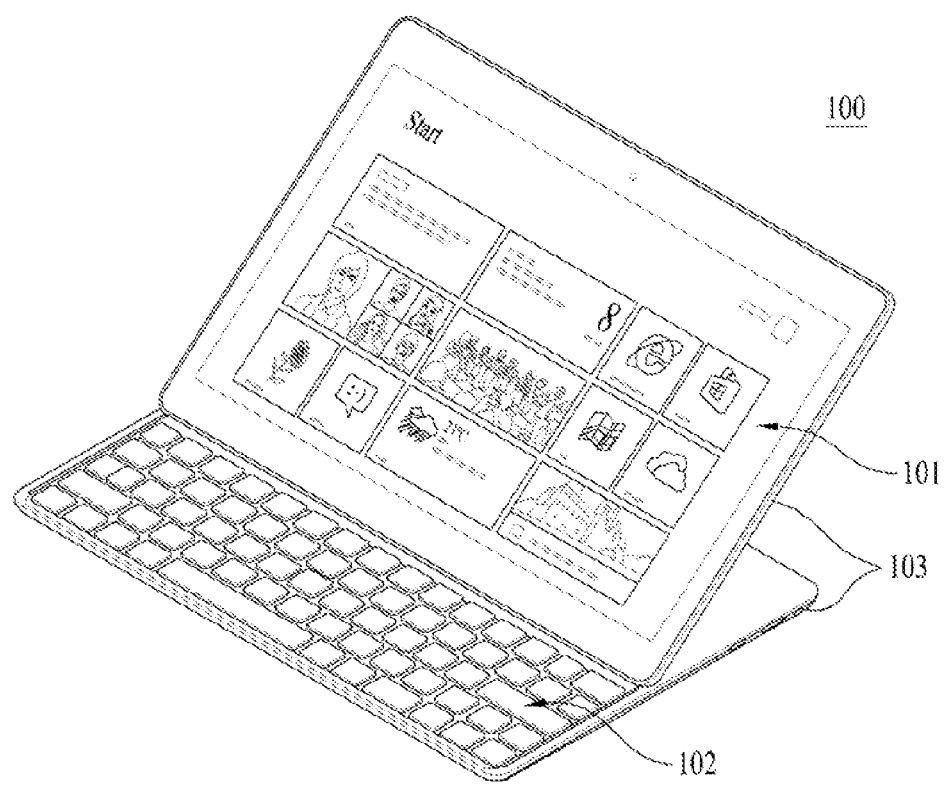
(b)

COMPUTING APPARATUS AND METHOD FOR CONTROLLING AUTOMATIC BOOTING WHEN COVER IS OPENED

This application claims the benefit of the Korean Patent Application No. 10-2014-0016026, filed on Feb. 12, 2014, which is hereby incorporated by reference as if fully set forth herein.

BACKGROUND OF THE INVENTION

Field of the Invention

The present invention relates to a computing apparatus and a method for controlling the same and, more particularly, to a computing apparatus and a method for controlling the same that can enables a booting process to be automatically executed when a cover provided on the computing apparatus is opened.

Discussion of the Related Art

Mobile computing apparatuses, such as notebook computers (or laptop computers) or subnotebook computers (or netbook computers), are gradually evolving to emphasize user convenience. Recently, by equipping a computing apparatus with a solid state drive (SSD), booting speed has increased to an outstanding rate.

In a general process for booting a computing apparatus, a user was required to open a cover covering a keyboard portion of the computing apparatus, and, then, the user was required to press a power button. However, in light of the user, since it will be obvious and apparent that, when the user is opening the cover of the computing apparatus, the user is intending to actually use the computing apparatus, it may seem unnecessary to undergo a process of pressing on a separate power button in order to turn the computing device on. Therefore, when using a mobile computing apparatus, a solution that can meet with the user's intentions as well as emphasizing user convenience is being required.

SUMMARY OF THE INVENTION

Accordingly, the present invention is directed to a computing apparatus and a method for controlling the same that substantially obviate one or more problems due to limitations and disadvantages of the related art.

A technical object that is to be achieved by an exemplary embodiment of the present invention is to provide an environment, wherein a user can use the computing apparatus by simply opening its cover.

Another technical object that is to be achieved by an exemplary embodiment of the present invention is to provide a user environment that is optimized to the user opening the cover of the computing device.

The technical objects of the present invention will not be limited only to the objects described above. Accordingly, technical objects that have not been mentioned above or additional technical objects of the present application may become apparent to those having ordinary skill in the art from the description presented below.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for controlling a computing apparatus according to an exemplary embodiment of the present invention includes the steps of receiving a user command configured to turn on an automatic booting mode through a user interface unit, delivering data corresponding to an ON state of the automatic booting mode to a BIOS module from an application module having an operating system stored therein, storing a configuration value corresponding to the ON state of the automatic booting mode in a Read-Only Memory (ROM) section of the BIOS module, when the cover is in a closed state, detecting an opening of the cover, and performing a predetermined operation in accordance with the configuration value being stored in the ROM section of the BIOS module, based upon a system status corresponding to when the cover is in a closed state.

In another aspect of the present invention, a computing apparatus according to an exemplary embodiment of the present invention includes a user interface unit configured to receive a user command configured to turn on an automatic booting mode, an application module configured to store an operating system and to deliver data corresponding to an ON state of the automatic booting mode to a BIOS module, a BIOS module configured to store a configuration value corresponding to the ON state of the automatic booting mode in a Read-Only Memory (ROM) section, a sensing unit configured to detect an opening of the cover, and an embedded controller configured to store a system status of the computing apparatus, wherein, when an opening of the cover is detected while the cover is in a closed mode, the BIOS module is configured to perform a predetermined operation in accordance with the configuration value being stored in the ROM section, based upon a system status corresponding to when the cover is in a closed state.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 illustrates a flow chart showing process steps of an automatic booting mode according to an exemplary embodiment of the present invention;

FIG. 4 illustrates an exemplary graphical user interface (GUI) for system configuration displayed on a display unit of the computing apparatus;

FIG. 5 illustrates an exemplary table for describing a standard of a firmware interface according to an exemplary embodiment of the present invention;

FIG. 12 illustrates a perspective view of a computing apparatus according to an exemplary embodiment of the present invention; and FIG. 13 illustrates a perspective view of a computing apparatus according to an exemplary embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a mobile user equipment related to the present invention will be described in detail with reference to the accompanying drawings. Additionally, the suffixes "module" and "unit" that are mentioned in the elements used in the present description are merely used individually or in combination for the purpose of simplifying the description of the present invention. Therefore, the suffix itself will not be used to differentiate the significance or function or the corresponding term.

Figure 1:
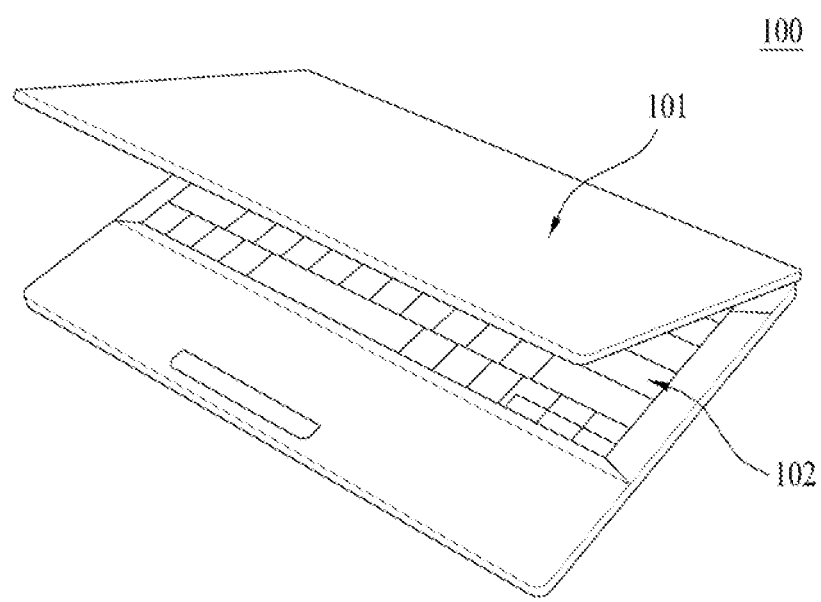
FIG. 1 illustrates a perspective view of a computing apparatus according to an exemplary embodiment of the present invention.

FIG. 1 illustrates a perspective view of a computing apparatus according to an exemplary embodiment of the present invention.

Referring to FIG. 1, the computing apparatus 100 according to the exemplary embodiment of the present invention is provided with a cover 101, which is provided with a display unit on one surface, and which faces into a keyboard 102 when the cover 101 is closed.

When a user does not use the computing apparatus 100, the cover 101 is generally closed to cover the keyboard 102. And, then, the user opens the cover 101 in order to user the computing apparatus 100. The user may be capable of freely adjusting an opening angle of the cover 101 as he (or she) wishes. Herein, for example, the opening angle of the cover 101 may be defined as an angle that is formed between the keyboard 102 and the cover 101.

According to the exemplary embodiment of the present invention, an environment allowing the user to user the computing apparatus 101 by simply opening the cover 101 without having to press (or push) on a separate power button.

In the related art, the user was required to first cover the cover 101 of the computing apparatus 100 and, then, attempt to execute a booting process by pressing on a power button, which is provided on the keyboard 102 or the cover 101 or a housing of the computing apparatus 100. Thereafter, the user was capable of using the computing apparatus 100 once an operating system (OS) is operated.

According to the exemplary embodiment of the present invention, the present invention provides an environment enabling the user to use the computing apparatus 100 by simply performing an action of opening the cover 101 without having to press on any separate power button. More specifically, when the user opens the cover 101, a booting process may be automatically executed, thereby operating the operating system. Hereinafter, such provision of an environment enabling the user to user the computing apparatus 100 by opening the cover 101 of the computing apparatus 100 will be referred to as an automatic booting mode.

Figure 2:
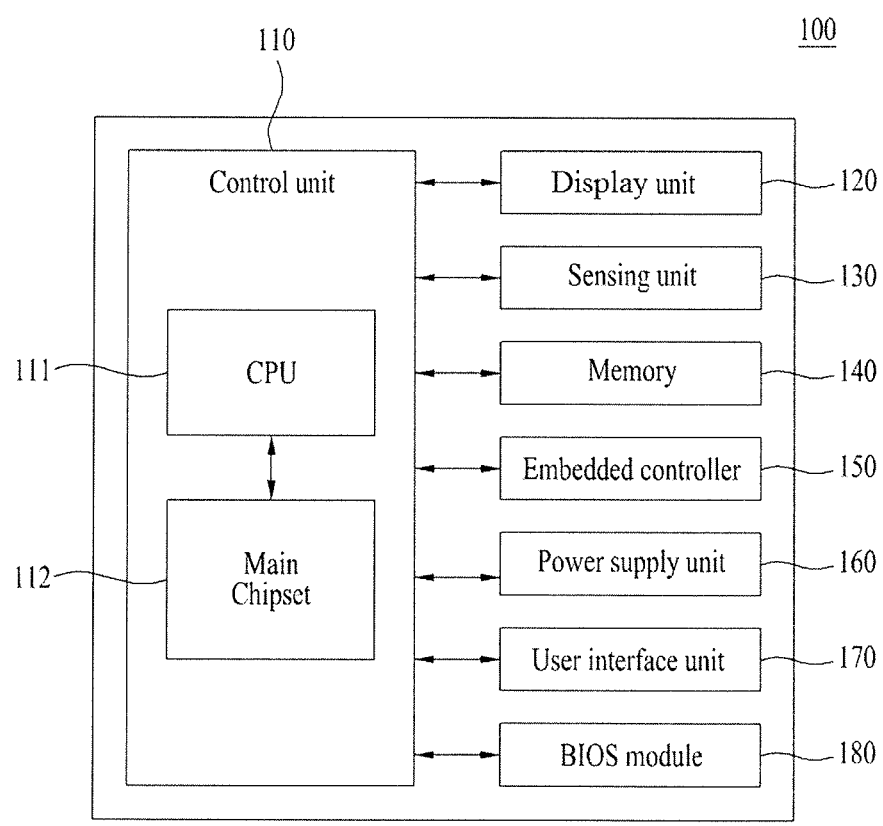
FIG. 2 illustrates a block view showing configuration modules of the computing apparatus according to an exemplary embodiment of the present invention.

FIG. 2 illustrates a block view showing configuration modules of the computing apparatus according to an exemplary embodiment of the present invention.

The computing apparatus 100 according to the exemplary embodiment of the present invention may include a central processing unit (CPU) 111, a main chipset 112, a display unit 120, a sensing unit 130, a memory 140, an embedded controller (EC) 150, a power supply unit 160, a user interface unit 170, and a BIOS module 180. However, since not all configuration elements shown in FIG. 2 are essentially required elements, the computing apparatus 100 may also be configured to have a larger number of configuration elements or a smaller number of configuration elements. For example, an input device for inputting user commands, such as a mouse, a touch sensor, a microphone, a camera, and so on, and an output device, such as a speaker, a printer, and so on, may be additionally equipped or connected to the computing apparatus 100 according to the present invention. Additionally, the technical scope and spirit of the present invention will not be limited only to the connection relationship between the configuration elements shown in FIG. 2.

Hereinafter, each of the configuration elements will be described in detail.

The central processing unit (CPU) 111 generally controls overall operations of the computing apparatus 100.

The main chipset 112 performs a similar function as a chipset, which is provided on a main board of a general computing apparatus. More specifically, the main chipset 112 may refer to a core controller chip, which connects each of the configuration elements to one another, and which controls each configuration element. The main chipset 112 collectively refers to a north bridge, which controls a memory and graphic, and a south bridge, which controls peripheral devices, such as an interface, and so on. Herein, each bridge may be configured of a separate device or may be configured as a single module. At this point, the north bridge may perform a function of controlling a graphical processing unit (GPU), which is separately provided, or a function of controlling a graphic card including the GPU. However, in this specification, the north bridge will be described as performing an overall control associated with the graphic regardless of whether or not a separate graphic card is being provided.

In this specification, the CPU 111 and the main chipset 112 may be collectively referred to as a control unit 110.

The display unit 120 displays (or outputs) information being processed by the computing apparatus 100. For example, the display unit 120 displays a processing result (or operation (or calculation) result) of the CPU 111 with respect to the operating system (OS) or application that is being executed, or the display unit 120 displays a user interface (UI) or a graphical user interface (GUI) in accordance with the control of the main chipset 112.

The display unit 120 is mounted on a surface of the cover 101, and, in some cases, the display unit 120 may be mounted on a surface facing into the keyboard 102, or may be mounted on another surface that does not face into the keyboard 102.

The display unit 120 may include at least one of a liquid crystal display (LCD), a thin film transistor-liquid crystal display (TFT LCD), an organic light-emitting diode (OLED), a flexible display, a 3-dimensional (3D) display, a quantum dot (QD) display, and a quantum dot light-emitting diode (QD LED) display.

In case the display unit 120 forms an inter-layer structure with a sensor (e.g., touch sensor), which detects touch motions, the display unit 120 may also be used as an input device in addition to being used as an output device. A touch sensor may be configured to have the form of a touch film, a touch sheet, a touch pad, and so on. Such touch sensor may correspond to a configuration elements belonging to the sensing unit 130.

The touch sensor may be configured to convert any change in a pressure being applied to a specific area of the display unit 120, or any change in a capacitance being generated on a specific area of the display unit 120, into an electrical signal. The touch sensor may be configured to detect not only a position and surface area that are being touched but also a pressure that is being applied at the point when a touch occurs.

When a touch input respective to a touch sensor occurs, the respective signal is delivered to a touch controller. The touch controller processes the signal and then transmits data corresponding to the processed result to the central processing unit (CPU) 111. Thus, the control unit 110 may be capable of determining (or knowing) which area of the display unit 120 has been touched.

The sensing unit 130 includes at least one sensor. The sensing unit 130 generates a sensing signal for detecting a current state of the computing apparatus 100, such as an open/closed stated of the cover 101, an opening angle of the cover 101, a location of the computing apparatus 100, a presence or absence of a user contact, and for controlling operations of the computing apparatus 100 to the control unit 110. According to the exemplary embodiment, the sensing unit 130 may also transmit (or deliver) the sensing signal to the embedded controller (EC) 150.

For example, the sensing unit 130 may include a distance sensor, an angle sensor, an image sensor, a gravity sensor, a geomagnetic (or terrestrial magnetism) sensor, a motion sensor, a gyroscope sensor, an acceleration sensor, an infrared sensor, an inclination sensor, a brightness sensor, an altitude sensor, an odor sensor, a temperature sensor (or thermal sensor), a depth sensor, a RGB sensor, a pressure sensor, a banding sensor, an audio sensor, a video sensor, a Global Positioning System (GPS) sensor, a touch sensor, a grip sensor, and so on.

The memory 140 may store programs or applications that are required for operating the computing apparatus 100 and for executing the functions of each configuration element.

The memory 140 may include at least one type of storage means, such as a flash memory type, a hard disk type, a multimedia card micro type, a card-type memory (e.g., SD or XD memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk, and an optical disk.

Within the memory 140, a portion of the memory 140 that stores the operating system (OS) may also be referred to as an application module. In a state when the operating system is being operated, the application module may be designed to deliver data corresponding to an ON command of the automatic booting mode, which is received from the user, to the BIOS module 180.

The embedded controller (EC) 150 corresponds to a processor that is being broadly used in mobile computing apparatuses, such as notebook computers. Herein, the embedded controller (EC) 150 may be configured by including a RAM. Signals being generated from each configuration element included in the computing apparatus 100 may be primarily stored in a RAM section of the embedded controller (EC) 150.

According to the exemplary embodiment, the embedded controller (EC) 150 may be supplied with power from the power supply unit 160 even when the computing apparatus 100 is in a power OFF state. More specifically, the embedded controller (EC) 150 may be maintained in an ON state even when the system status of the computing apparatus 100 is in an S5 (Soft Off) state.

The embedded controller (EC) 150 may store the system state of the computing apparatus 100. In case the user has closed the cover 101 after ending the usage of the computing apparatus 100, the embedded controller (EC) 150 may store the system status in the state when the cover 101 of the computing apparatus 100 is closed.

The power supply unit 160 is provided with an external power (or power from an external power source) or an internal power (or power from an internal source) and may supply power required for operating each configuration element.

A battery may correspond to an internal battery (or embedded battery), which is configured to be rechargeable. And, such battery may be detachably fixed to a body of the computing apparatus 100 in order to be recharged. The embedded controller (EC) 150 may periodically or non-periodically (or aperiodically) check a remaining amount of battery power remaining in the battery, which is included in the power supply unit 160.

According to the exemplary embodiment, in case the amount of battery power remaining in the battery, which is included in the power supply unit 160, is less than or equal to a predetermined level, the embedded controller (EC) 150 may deliver data corresponding to the OFF state of the automatic booting mode to the BIOS module. More specifically, the automatic booting mode may be set to an OFF state. In case the battery is completely out of power (or discharged), the system status of the computing apparatus 100 becomes unknown due to the deletion of all data stored in the RAM section of the embedded controller (EC) 150. Accordingly, such procedure is performed in order to prevent the BIOS module 180 to operate differently from the intentions of the user, when the user opens the cover 101 of the computing apparatus 100 after recharging the battery.

The user interface unit 170 receives a user command for controlling the operations of the computing apparatus 100. The user interface unit 170 may be configured to include a keyboard 102, a mouse, diverse buttons, diverse keys, a touch sensor, a switch, and so on.

The BIOS module 180 controls basic operations of all hardware and software equipped in the computing apparatus 100. If the computing apparatus 100 is turned on, the BIOS module 180 verifies whether or not the main hardware is being operated normally, and, then, the BIOS module 180 summons a file of the operating system, which is stored in the memory 140, so as to initiate the booting process.

According to the exemplary embodiment, when the user inputs a user command, which turns the automatic booting mode on, through the user interface unit 170, the application module delivers the data corresponding to the ON state of the automatic booting mode to the BIOS module 180. And, then, the BIOS module 180 stores a configuration value corresponding to the ON state of the automatic booting mode in its ROM section. In some cases, the BIOS module 180 may correspond to the ROM itself. Thereafter, while the cover 101 of the computing apparatus 100 is in a closed state, when the opening of the cover 101 is detected, the BIOS module 180 performs a predetermined operation in accordance with the configuration value, which is stored in the ROM section, based upon the system status when the cover 101 of the computing apparatus 100 is in a closed state. Such communication between the application module and the BIOS module 180 may be configured by a separate firmware interface standard, which is provided to enable access to be established by using a Windows Management Instrument (WMI) in accordance with an Advanced Configuration and Power Interface (ACPI) standard.

FIG. 3 illustrates a flow chart showing process steps of an automatic booting mode according to an exemplary embodiment of the present invention.

The user may set the automatic booting mode to an ON/OFF state (S201). For example, the user may first execute a system configuration program, which is installed in the computing apparatus 100, and may then set the automatic booting mode to an ON state.

FIG. 4 illustrates an exemplary graphical user interface (GUI) for system configuration displayed on a display unit of the computing apparatus.

Referring FIG. 4, when the user executes a system configuration program, which is installed in the computing apparatus 100, a GUI 210 for system configuration may be displayed on the display unit 120, as shown in FIG. 4. The user may set the automatic booting mode to an ON state through an automatic booting mode option 211, which is included in the GUI 210. The user interface unit 170 receives a user command, which is inputted to turn the automatic booting mode on.

Referring back to FIG. 3, according to the control of the control unit 110, the application module delivers data corresponding to the ON state of the automatic booting mode to the BIOS module 180 (S202). Such communication between the application module and the BIOS module 180 may be configured by a separate firmware interface standard, which is provided to enable access to be established by using a Windows Management Instrument (WMI) in accordance with an Advanced Configuration and Power Interface (ACPI) standard.

FIG. 5 illustrates an exemplary table for describing a standard of a firmware interface according to an exemplary embodiment of the present invention.

Referring to FIG. 5, when the automatic booting mode is turned on by the user, the application module may deliver data, which correspond to a value of '1' being assigned to a Payload, to the BIOS module 180 in accordance with the firmware interface standard.

Referring back to FIG. 3, the BIOS module 180 stores the configuration value of the automatic booting mode to the ROM section (S203). Herein, the configuration value of the automatic booting mode refers to a value, which is required for controlling the operations of the BIOS module 180, when the opening of the cover 101 is detected, while the cover 101 of the computing apparatus 100 is in a closed state, in a later process. More specifically, when the user has closed the cover 101 after ending (or finishing) the use of the computing apparatus 100, and, then, when the user re-opens the cover 101 in order to use the computing apparatus 100 again, depending upon the system status respective to when the cover 101 has been opened from its previous closed state, the operation performed by the BIOS module 180 may vary. Accordingly, the data that are required for controlling such operations of the BIOS module 180 correspond to the configuration value.

When the user finishes using the computing apparatus 100 and closes the cover 101, the system status of the computing apparatus 100 may be divided into four different states. However, the present invention will not be limited only to this. The system status of the computing apparatus 100 may be divided (or categorized) into an S0 (Working) state, an S3 (Sleeping) state, an S4 (Hibernation) state, and an S5 (Soft Off) state as defined by the Advanced Configuration and Power Interface (ACPI) standard. Each state will be described in more detailed as follows. The S0 (Working) state corresponds to a state when all functions of the computing apparatus 100 can be used. The S3 (Sleeping) state corresponds to a power saving mode, wherein power is being supplied to the main memory. The S4 (Hibernation) state corresponds to a maximum power saving mode, wherein all content stored in the system memory is recorded in a non-volatile memory, such as a hard disk, and wherein the system power is blocked. And, the S5 (Soft Off) state corresponds to a general state when the system power is blocked. The BIOS module 180 may store configuration values respective to how the BIOS module 180 is to be operated in accordance with the above-described system status of the computing apparatus 100 in the ROM section.

While the cover 101 is in a closed state, the sensing unit 130 detects the opening of the cover 101 (S204). As described above, the user stops his (or her) usage of the computing apparatus 100 and, before closing the cover 101, the user may set the system status to any one of S0, S3, S4, and S5 states. The power supply unit 160 is configured to supply power to the sensing unit 130, even when the system status of the computing apparatus 100 is in the S3, S4, or S5 state.

When the opening of the cover 101 is detected, the BIOS module 180 performs operations, which are predetermined in accordance with the configuration values stored in the ROM section, based upon the system status when the cover 101 is closed (S205). The embedded controller (EC) 150 may detect the detection result of the sensing unit 130 and may control the operations of the BIOS module 180 in accordance with the detected detection result.

Figures 6, 7:
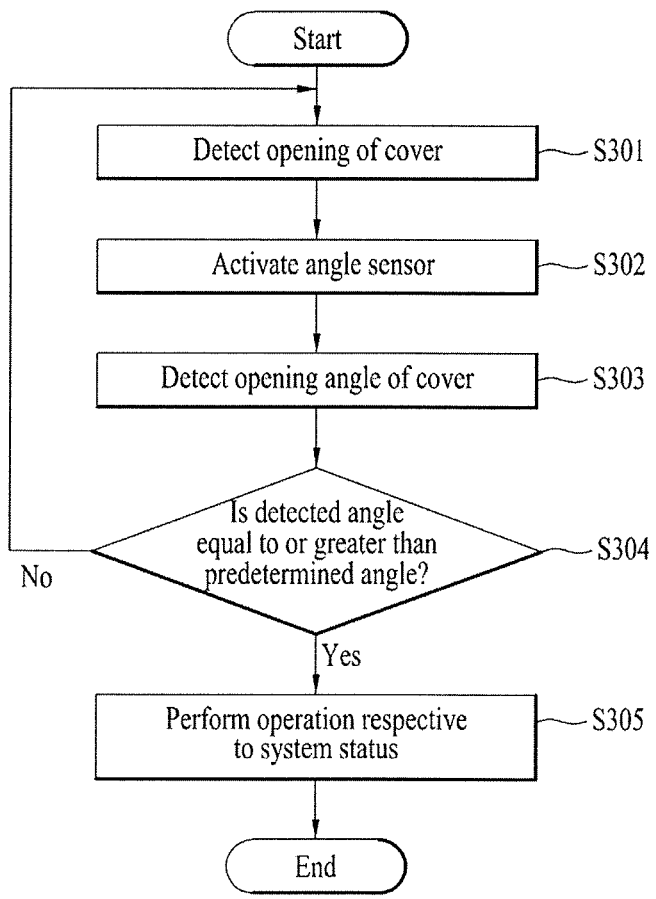
FIG. 6 illustrates an exemplary table showing configuration values corresponding to an ON state of the automatic booting mode being stored in a BIOS module according to an exemplary embodiment of the present invention.
FIG. 7 illustrates a flow chart showing process steps of an automatic booting mode according to an exemplary embodiment of the present invention.

FIG. 6 illustrates an exemplary table showing configuration values corresponding to an ON state of the automatic booting mode being stored in a BIOS module according to an exemplary embodiment of the present invention. Referring to FIG. 6, when the opening of the cover 101 is detected, the operations of the BIOS module 180 will hereinafter be described in detail.

When the system status of the computing apparatus 100 is in the S0 state, and when the user closes the cover 101, only the panel of the display unit 120 in the computing apparatus 100 is in an OFF state. In this case, when the opening of the cover 101 is detected, the BIOS module 180 only turns on the panel of the display unit 120 and does not perform any other operations. According to the exemplary embodiment, when the system status is in the S0 state while the cover 101 is in a closed state, with the exception for the panel of the display unit 120 being turned off, the usage environment is no different from the usage environment of the general computing apparatus 100. And, therefore, when the opening of the cover 101 is detected, the panel of the display unit 120 may be realized to be activated in accordance with the control of the control unit 110 instead of the BIOS module 180.

Alternatively, when the system status is in the S3 state while the cover 101 is in a closed state, and when the opening of the cover 101 is detected, the BIOS module 180 may awake from the S3 state and may perform operation of entering the S0 state.

Alternatively, when the system status is in the S4 state while the cover 101 is in a closed state, and when the opening of the cover 101 is detected, the BIOS module 180 may awake from the S4 state and may perform operation of entering the S0 state.

Alternatively, when the system status is in the S5 state while the cover 101 is in a closed state, and when the opening of the cover 101 is detected, the BIOS module 180 may initiate a booting process for operating the operating system.

However, according to the exemplary embodiment, in case the user has intentionally ended the system in order to replace the hardware, or in case the operating system has been abnormally tended due to a system error, and so on, even if the opening of the cover 101 is detected, control operations according to which the BIOS module 180 is not operated may meet with the user's intent. Therefore, the BIOS module 180 may end the system by using a specific command (or instruction word), or, in case the operating system has been abnormally ended, the BIOS module 180 may delete the configuration value corresponding to the ON state of the automatic booting mode prior to the ending of the system and may then set the automatic booting mode to an OFF state.

Additionally, according to the exemplary embodiment, when the opening of the cover 101 is detected by the sensing unit 130, and when the closing of the cover is detected with a predetermined period of time afterwards, the BIOS module 180 may perform operations of recovering the system status back to a status corresponding to when the cover 101 is in a closed state 101 prior to the detection of the opening of the cover 101. When the cover 101 is opened and then closed within a short period of time, it may be understood that the cover 101 has been unintentionally opened as opposed to what was initially intended by the user. In this case, the BIOS module 180 may be configured to return to the previous system status after completing the execution of step S205. And, when the closing of the cover 101 is detected while step S205 is being executed, the BIOS module 180 may be configured to stop the operation being executed and then to return to the previous system status. Alternatively, instead of returning to the system status correspond to when the cover 101 is in the closed state prior to the detection of the opening of the cover 101, the BIOS module 180 may perform operations of entering any one of the S3 state, the S4 state, and the S5 state in accordance with pre-stored user configuration. Herein, the pre-stored user configuration may correspond to data corresponding to the user command, which is received from the user interface unit 170, being received by the BIOS module 180 from the application module and then being stored in the ROM section.

Meanwhile, according to the present invention, instead of having the BIOS module 180 be operated immediately after the opening of the cover 101 is detected, the computing apparatus 100 may be configured to have the BIOS module 180 be operated only after the cover 101 is opened at an angle equal to or greater (or more) than a predetermined angle. This will be described in more detail with reference to FIG. 7.

FIG. 7 illustrates a flow chart showing process steps of an automatic booting mode according to an exemplary embodiment of the present invention. A case when the user closes the cover 101 after completing the process steps (steps S201 to S203), which are described above with reference to FIG. 3, will be assumed and described in detail with reference to FIG. 7.

When the cover 101 is in a closed state, the sensing unit 130 detects the opening of the cover 101 (S301).

When the opening of the cover 101 is detected, the sensing unit 130 activates an angle sensor, which is configured to detect an opening angle of the cover 101 (S302). In this specification, a sensor that can detect (or sense) the opening angle of the cover 101 will be referred to as an angle sensor. According to the exemplary embodiment, the angle sensor may be embodied within a sensor detecting the opening and closing of the cover 101. For example, the sensing unit 130 may activate the angle sensor in accordance with the control of the embedded controller (EC) 150. According to the exemplary embodiment, the angle sensor may exist in an activated state along with the sensor detecting the opening and closing of the cover 101. In this case, the above-described step S302 may be omitted.

The sensing unit 130 uses the angle sensor to detect the opening angle of the cover 101 (S303). The angle sensor, which is included in the sensing unit 130, may, for example, detect an angle between the cover 101 and the keyboard 102.

The embedded controller (EC) 150 detects the detected result of the sensing unit 130 and checks whether or not the opening angle of the cover 101 is equal to or greater than a predetermined angle (S304).

In case the opening angle of the cover 101 is equal to or greater than the predetermined angle, the embedded controller (EC) 150 performs control operations that can operate the BIOS module 180, and the BIOS module 180 performs a predetermined operation in accordance with a configuration value, which is stored in the ROM section, based upon the system status corresponding to when the cover 101 is in a closed state (S305). The operation of the BIOS module 180, which is based upon the system status corresponding to when the cover 101 is in a closed state, is identical to the operation described above with reference to FIG. 6. And, therefore, a detailed description of the same will be omitted for simplicity.

Meanwhile, according to the present invention, when the BIOS module 180 is operated after the opening of the cover 101 is detected, in case the cover 101 cannot be opened at an angle larger than a predetermined angle, the computing apparatus 100 may be configured to return to the system status prior to the opening of the cover 101. In case the cover 101 is not opened at an angle larger than the predetermined angle and then closed, this may be understood that, as opposed to the user's intentions, the user has accidentally opened the cover 101. This will be described in more detail with reference to FIG. 8.

Figure 8:
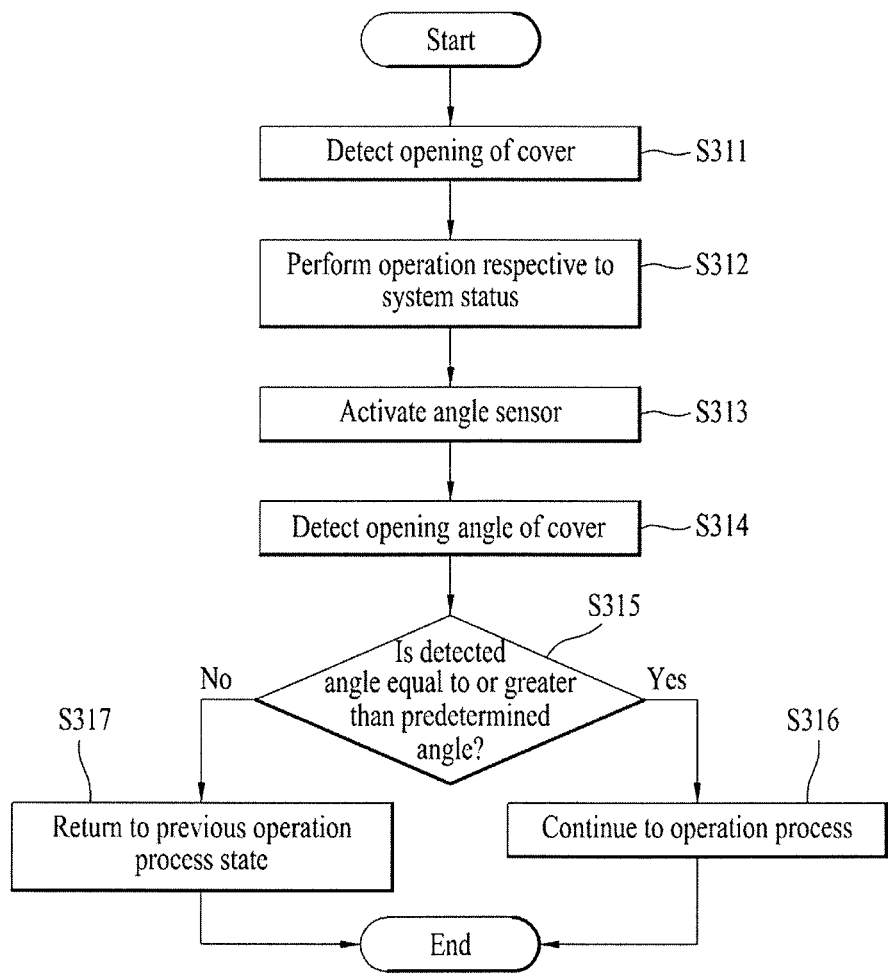
FIG. 8 illustrates a flow chart showing process steps of an automatic booting mode according to an exemplary embodiment of the present invention.

FIG. 8 illustrates a flow chart showing process steps of an automatic booting mode according to an exemplary embodiment of the present invention. A case when the user closes the cover 101 after completing the process steps (steps S201 to S203), which are described above with reference to FIG. 3, will be assumed and described in detail with reference to FIG. 8.

When the cover 101 is in a closed state, the sensing unit 130 detects the opening of the cover 101 (S311).

When the opening of the cover 101 is detected, the BIOS module 180 performs a predetermined operation in accordance with a configuration value, which is stored in the ROM section, based upon the system status corresponding to when the cover 101 is in a closed state (S312). The embedded controller (EC) 150 may detect the detected result of the sensing unit 130 and may control the operations of the BIOS module 180 in accordance with the detected result. The operation of the BIOS module 180, which is based upon the system status corresponding to when the cover 101 is in a closed state, is identical to the operation described above with reference to FIG. 6. And, therefore, a detailed description of the same will be omitted for simplicity.

Meanwhile, when the opening of the cover 101 is detected, the sensing unit 130 activates an angle sensor, which is configured to detect an opening angle of the cover 101 (S313). For example, the sensing unit 130 may activate the angle sensor in accordance with the control of the emhedded controller (FC) 150 Instead of being performed after the process step S312 is completed, step S313 may be performed in parallel with step S312, and, in some cases, step S313 may be processed earlier than step S312.

The sensing unit 130 uses the angle sensor to detect the opening angle of the cover 101 (S314). The angle sensor, which is included in the sensing unit 130, may, for example, detect an angle between the cover 101 and the keyboard 102.

The embedded controller (EC) 150 detects the detected result of the sensing unit 130 and checks whether or not the opening angle of the cover 101 is equal to or greater than a predetermined angle (S315).

The process steps S314 and S315 may be performed in parallel with process step S312. More specifically, while performing steps S314 and S315, the BIOS module 180 continues to perform the predetermined operations.

In case the opening angle of the cover 101 is equal to or greater than a predetermined angle, the embedded controller (EC) 150 performs control operations allowing the BIOS module 180 to continue to perform a predetermined operation (S316). More specifically, in case the opening angle of the cover 101 is equal to or greater than the predetermined angle, step S312 may be continuously performed.

Conversely, in case the opening angle of the cover 101 is smaller than a predetermined angle, the embedded controller (EC) 150 controls the BIOS module 180 so that the system status can return to a state prior to the opening of the cover 101 (S317). In this case, the BIOS module 180 may be configured to return to a previous system status after completing process step S312, or the BIOS module 180 may be configured to stop the performance of step S312 and then return to its previous system the previous system status.

Meanwhile, according to the present invention, in case a number of users of the computing apparatus 100 is greater than '1', a user environment that is optimized to each user may be provided. This will be described in more detail with reference to FIG. 9 and FIG. 10.

Figure 9:
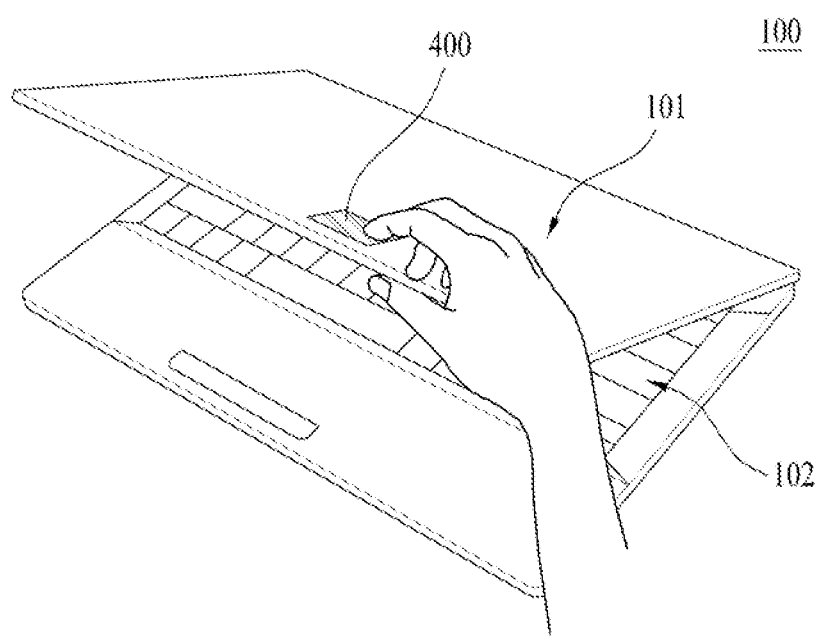
FIG. 9 illustrates a perspective view of a computing apparatus according to an exemplary embodiment of the present invention.

FIG. 9 illustrates a perspective view of a computing apparatus according to an exemplary embodiment of the present invention.

Referring to FIG. 9, the computing apparatus 100 according to the exemplary embodiment of the present invention is provided with a cover 101, which is provided with a display unit on one surface, and which faces into a keyboard 102 when the cover 101 is closed. A fingerprint recognition sensor (or fingerprint sensor) 400 may be provided on a portion of the cover 101. The fingerprint recognition sensor 400 may correspond to a configuration element that is included in the sensing unit 130. The positioning of the fingerprint recognition sensor 400 may vary in accordance with the exemplary embodiment. However, based upon the user's convenience, it will be preferable to locate the fingerprint recognition sensor 400 on a portion where the user's finger naturally touches, when the user opens the cover 101.

The memory 140 may map each fingerprint recognition result to a respective user account and may store the mapping of the fingerprint recognition result. Each user may store his (or her) fingerprint recognition result in the memory 140 by using the user interface unit 170, and the user may create his (or her) own user account and may store the created user account in the memory 140 in advance.

After the operating system is operated, the control unit 110 may detect the user account, which is mapped to the fingerprint recognition result detected by the fingerprint recognition sensor 400 and then stored, and may provide a user environment corresponding to the detected user account. The provision of a user account to each user may indicate that an image or configuration of a main screen may vary with respect to a predetermined user environment or that the type of program or application may vary with respect to the predetermined user environment.

Figure 10:
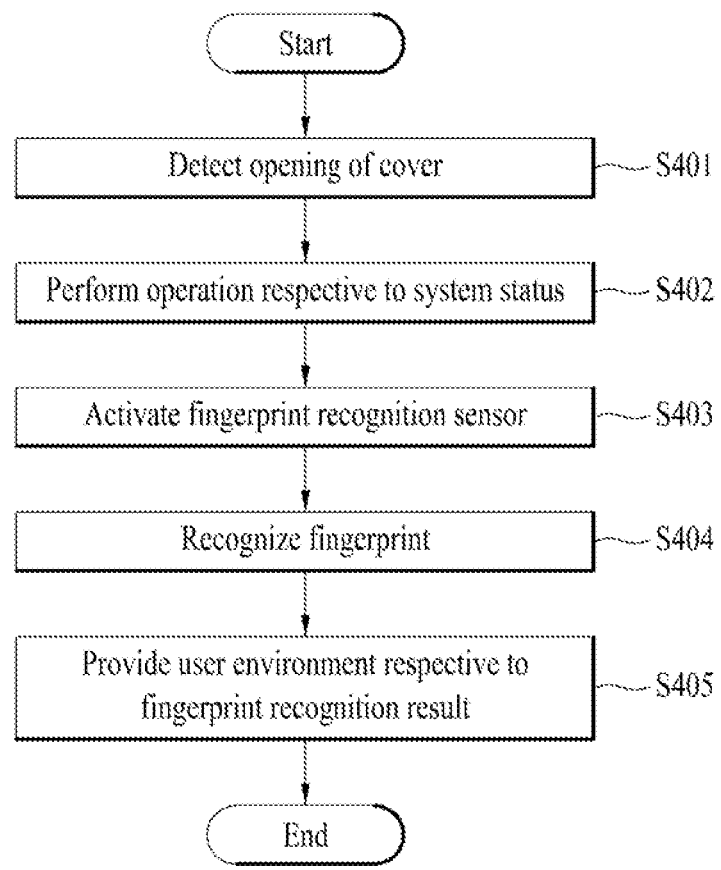
FIG. 10 illustrates a flow chart showing process steps of an exemplary method for providing a user environment that is respectively optimized to each user according to an exemplary embodiment of the present invention.

FIG. 10 illustrates a flow chart showing process steps of an exemplary method for providing a user environment that is respectively optimized to each user according to an exemplary embodiment of the present invention. Hereinafter, an exemplary method for providing a user customized environment will be described in detail with reference to FIG. 10. A case when the user closes the cover 101 after completing the process steps (steps S201 to S203), which are described above with reference to FIG. 3, will be assumed and described in detail with reference to FIG. 10.

When the cover 101 is in a closed state, the sensing unit 130 detects the opening of the cover 101 (S401).

When the opening of the cover 101 is detected, the BIOS module 180 performs a predetermined operation in accordance with a configuration value, which is stored in the ROM section, based upon the system status corresponding to when the cover 101 is in a closed state (S402). The embedded controller (EC) 150 may detect the detected result of the sensing unit 130 and may control the operations of the BIOs module 180 in accordance with the detected result. The operation of the BIOS module 180, which is based upon the system status corresponding to when the cover 101 is in a closed state, is identical to the operation described above with reference to FIG. 6. And, therefore, a detailed description of the same will be omitted for simplicity.

When the opening of the cover 101 is detected, the sensing unit 130 activates the fingerprint recognition sensor (or fingerprint sensor) (S403). For example, the sensing unit 130 may activate the fingerprint recognition sensor in accordance with the control of the embedded controller (EC) 150. Instead of being performed after the process step S402 is completed, step S403 may be performed in parallel with step S402, and, in some cases, step S403 may be processed earlier than step S402.

The sensing unit 130 senses the user's fingerprint through the fingerprint recognition sensor (S404). Step S404 may also be performed in parallel with step S402. When the operating system is operated by the operation of the BIOS module 180, and when the control unit 110 is activated accordingly, the embedded controller (EC) 150 may deliver the fingerprint recognition result of the fingerprint recognition sensor to the control unit 110.

The control unit 110 accesses the memory 140 and detects the user account, which is mapped to the fingerprint recognition result and then stored, and, then, provides a user environment respective to the detected user account (S405). At this point, the control unit 110 may log-in (or sign-in) to the detected user account. The display unit 120 may output a display screen respective to the user environment in accordance with the control of the control unit 110.

Meanwhile, according to the present invention, a hardware key that can turn the automatic booting mode on/off may be provided on the body of the computing apparatus 100. This will hereinafter be described in detail with reference to FIG. 11.

Figure 11:
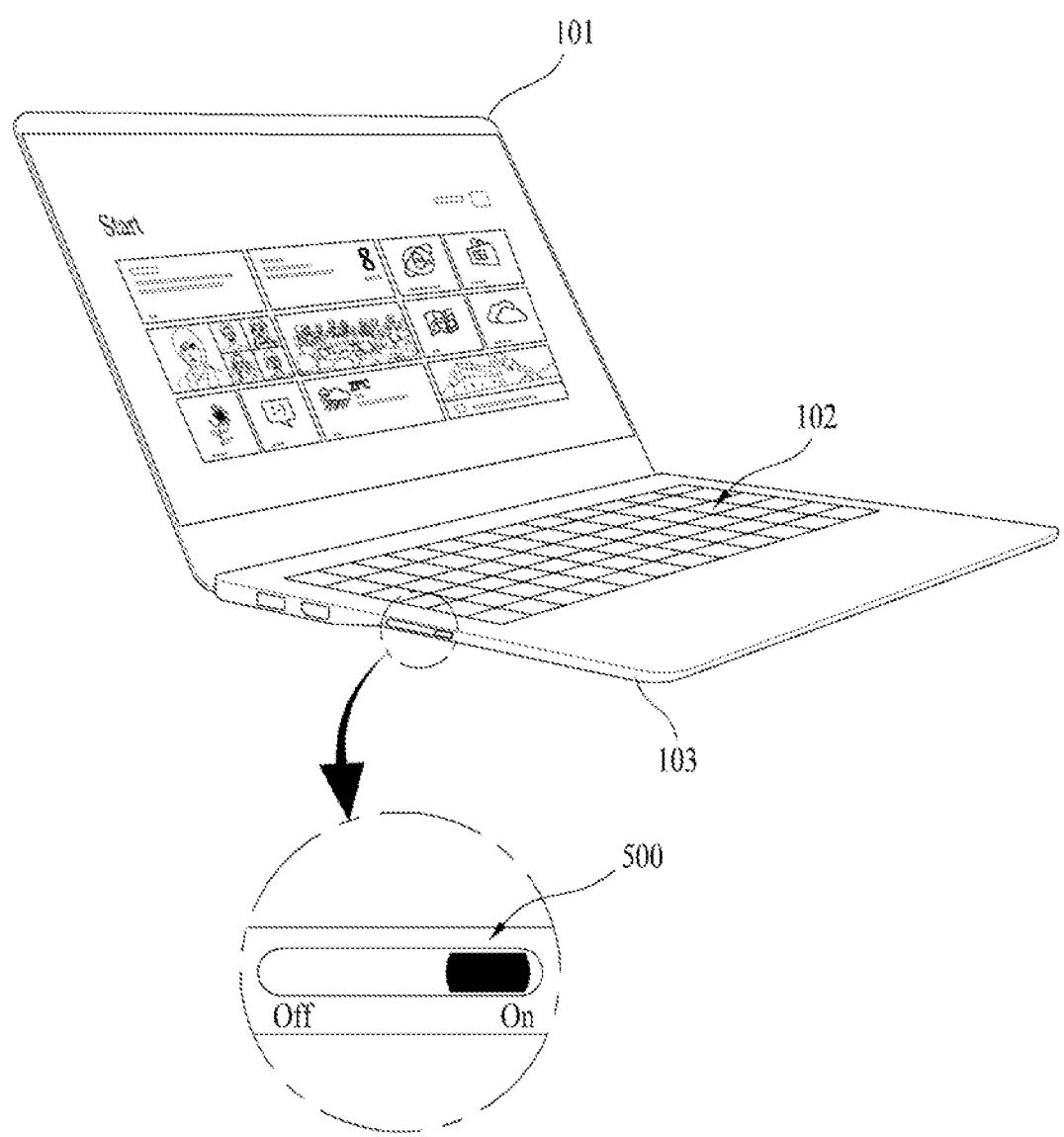
FIG. 11 illustrates a perspective view of a computing apparatus according to an exemplary embodiment of the present invention.

FIG. 11 illustrates a perspective view of a computing apparatus according to an exemplary embodiment of the present invention.

Referring to FIG. 11, a hardware key 500 that can turn the automatic booting mode on/off may be provided on the body 103 of the computing apparatus 100.

According to an exemplary usage of the computing apparatus 100, when the user selects an OFF state of the automatic booting mode through the GUI 210, shown in FIG. 4, and then ends the system, although the user has closed the cover 101 after ending the system, the user may want to re-use the automatic booting mode. At this point, the user may activate the automatic booting mode by using the hardware key 500, which is provided on the body 103 of the computing apparatus 100. In this case, when the opening of the cover 101 is detected, the embedded controller (EC) 150 delivers data corresponding to the ON state of the automatic booting system to the BIOS module 180. As described above in step 203 of FIG. 3, the BIOS module 180 may store a configuration value corresponding to the ON state of the automatic booting system in the ROM section, and, then, the BIOS module 180 may perform predetermined operations in accordance with the configuration value being stored in the ROM section based upon the system status corresponding to the closed state of the cover 101.

Meanwhile, according to the present invention, in order to allow the BIOS module 180 to be operated at the same time as the opening of the cover 101, only when it is clearly intended by the user, the computing apparatus 100 may be configured to allow the BIOS module 180 to be operated only when the cover 101 is opened, while a separate sensor provided on the cover 101 is in a touched state, or while a separate key provided on the cover 101 is in a pressed state. This will hereinafter be described in detail with reference to FIG. 12.

FIG. 12 illustrates a perspective view of a computing apparatus according to an exemplary embodiment of the present invention.

Referring to FIG. 12, a user input unit 600 is provided on the body 103 of the computing apparatus 100. For example, the user input unit 600 may be configured to have the form of a hardware key or a press-type button. However, the user input unit 600 will not be limited only to this.

The positioning of the user input unit 600 may vary in accordance with the exemplary embodiment, and, as shown in FIG. 12, the positioning of the user input unit 600 will not be limited only to being positioned on one surface of the cover 101, as shown in FIG. 12. Nevertheless, in light of user convenience it will be preferable that, when the user opens the cover 101, the user input unit 600 is located at a position on the cover 101 where the user's finger naturally touches.

According to the exemplary embodiment, only when the user inputs a predetermined user command by touching or pressing the user input unit 600, and when the opening of the cover 101 is detected at the same time, the BIOS module 180 may be operated, so as to perform a predetermined operation in accordance with a respective configuration value, which is stored in the ROM section based upon the system status corresponding to the state when the cover is closed.

As shown in (a) of FIG. 12, when the user opens the cover 101 without contacting his (or her) hand on the user input unit 600, the BIOS module 180 is not operated, and the booting process may be initiated only by having the user press on a separate power button, which is provided on the keyboard 102. However, as shown in (b) of FIG. 12, when the user opens the cover 101 while putting his (or her) hand on the user input unit 600, as described above, the BIOS module 180 is operated according to the exemplary embodiments of the present invention.

Meanwhile, a solution corresponding to a case when the computing apparatus 100 according to an exemplary embodiment of the present invention corresponds to a device that is suitable for a two-way usage to and from a laptop computer (or notebook computer) and a tablet PC, will hereinafter be described in detail with reference to FIG. 13.

FIG. 13 illustrates a perspective view of a computing apparatus according to an exemplary embodiment of the present invention.

Referring to FIG. 13, the computing apparatus 100 according to the exemplary embodiment of the present invention functions as tablet PC, when the cover 101 is closed, and functions as a laptop computer, when the cover 101 is opened. Hereinafter, a case of using the computing apparatus 100 while the cover 101 is in an open state will be referred to as a keyboard mode.

The above-described description of the present invention respective to FIG. 1 to FIG. 12 may be applied to a case when the computing apparatus 100 is being used as a laptop computer, as shown in (b) of FIG. 13.

When the computing apparatus 100 is in a state of having its cover 101 closed, the user may open the cover 101 of the computing apparatus 100 by using a separate hardware key (not shown), which is provided on the body 103 of the computing apparatus 100, so as to shift the computing apparatus 100 to the keyboard mode. When the user shifts the computing apparatus 100 to the keyboard mode by using the separate hardware key, which is provided on the body 103 of the computing apparatus 100, it may be determined that the opening of the cover 101 is detected, and, then, the BIOS module 180 may be operated, as described above with reference to FIG. 1 to FIG. 12. Since the BIOS module 180 has already been described in detail with reference to FIG. 1 to FIG. 12, a detailed description of the same will be omitted for simplicity.

According to the exemplary embodiment of the present invention, the above-described method (flow chart) may be implemented in a storage medium as processor-readable code, which can be read by a processor. Examples of the processor-readable storage medium may include a ROM, a RAM, a CD-ROM, an electro-magnetic tape, a floppy disk, an optical data storage device, and so on. Furthermore, the processor-readable storage medium may also include storage media that can be realized in the form of carrier waves (e.g., transmission via the Internet).

As described above, the computing apparatus and the method for controlling the same have the following advantages. The computing apparatus and the method for controlling the same according to the exemplary embodiment of the present invention may provide an environment, wherein a user can use the computing apparatus by simply opening its cover. Additionally, the present invention may also provide a user environment that is optimized to the user opening the cover of the computing device.

The advantages of the present invention will not be limited only to the advantages described above. Accordingly, advantages that have not been mentioned above or additional advantages of the present application may become apparent to those having ordinary skill in the art from the description presented above.

Moreover, the configuration and method for configuring the above-described exemplary embodiments of the electronic device will not be limited only to the examples presented herein. And, therefore, it will be apparent that the exemplary embodiments of the present specification may be fully or partially modified and combined so as to implement a new exemplary embodiment of the present specification.

Furthermore, although the preferred embodiments of presented herein have been described in this specification and with reference to the accompanying drawings, and although specific terms have been used herein, such description and terms have been given and used for the mere purpose of facilitating the understanding of the technical aspects of the present invention within the general knowledge. And, therefore, it will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents, and that the varied embodiments should not be separately interpreted and understood from the technical scope and spirit of the present specification.

What is claimed is:

1. As a method for controlling a computing apparatus, wherein the computing apparatus is provided with a display unit on one surface and a cover facing into a keyboard, when the cover is in a closed state, the method for controlling the computing apparatus comprises:
    receiving a user command to turn on an automatic booting mode through a user interface;
    delivering data corresponding to an ON state of the automatic booting mode to a BIOS module from an application module having an operating system stored therein;
    storing a configuration value corresponding to the ON state of the automatic booting mode in a Read-Only Memory (ROM) section of the BIOS module;
    when the cover is in a closed state, detecting an opening of the cover; and
    performing a predetermined operation in accordance with the configuration value being stored in the ROM section of the BIOS module, based upon a system status corresponding to when the cover is in a closed state.

2. The method of claim 1, wherein the system status corresponds to any one of a S0 state, a S3 state, a S4 state, and a S5 state, each state being defined by an Advanced Configuration and Power Interface (ACPI) standard.

3. The method of claim 2, wherein the performing a predetermined operation comprises:
    activating a panel of the display unit, when the system status corresponding to a case when the cover is in a closed state corresponds to the S0 state.

4. The method of claim 2, wherein the performing a predetermined operation comprises:
    entering the S0 state, when the system status corresponding to a case when the cover is in a closed state corresponds to the S3 state or the S4 state.

5. The method of claim 2, wherein the performing a predetermined operation comprises:
    performing a booting process for operating the operating system, when the system status corresponding to a case when the cover is in a closed state corresponds to the S5 state.

6. The method of claim 1, further comprising:
    when the cover is in an open state, detecting an opening angle of the cover; and
    checking whether or not the detected opening angle of the cover is equal to or greater than a predetermined angle.

7. The method of claim 6, wherein the performing a predetermined operation is performed, when the detected opening angle of the cover is equal to or greater than the predetermined angle.

8. The method of claim 6, further comprising:
    returning to a system status corresponding to the case when the cover is in a closed state, when the detected opening angle of the cover is smaller than the predetermined angle.

9. The method of claim 1, further comprising:
    when the cover is in an open state, recognizing fingerprints through a fingerprint recognition sensor; and
    detecting a user account being mapped to the fingerprint recognition result and stored.

10. The method of claim 1, further comprising:
    after an opening of the cover is detected, when a closing of the cover is detected within a predetermined period of time, returning to a system status corresponding to a case when the cover is in a closed state, prior to detecting the opening of the cover.

11. The method of claim 2, further comprising:
    after an opening of the cover is detected, when a closing of the cover is detected within a predetermined period of time, entering any one of the S3 state, the S4 state, and the S5 state in accordance with pre-stored user configuration.

12. As a computing apparatus being provided with a display unit on one surface and a cover facing into a keyboard, when the cover is in a closed state, the computing apparatus comprises:
    a user interface to receive a user command configured to turn on an automatic booting mode;
    an application module to store an operating system and to deliver data corresponding to an ON state of the automatic booting mode to a BIOS module;
    a BIOS module to store a configuration value corresponding to the ON state of the automatic booting mode in a Read-Only Memory (ROM) section;
    a sensing unit to detect an opening of the cover; and
    an embedded controller to store a system status of the computing apparatus,
    wherein, when an opening of the cover is detected while the cover is in a closed mode, the BIOS module is configured to perform a predetermined operation in accordance with the configuration value being stored in the ROM section, based upon a system status corresponding to when the cover is in a closed state.

13. The apparatus of claim 12, wherein the system status corresponds to any one of a S0 state, a S3 state, a S4 state, and a S5 state, each state being defined by an Advanced Configuration and Power Interface (ACPI) standard.

14. The apparatus of claim 13, wherein the BIOS module activates a panel of the display unit, when the system status corresponding to a case when the cover is in a closed state corresponds to the S0 state.

15. The apparatus of claim 13, wherein the BIOS module enters the S0 state, when the system status corresponding to a case when the cover is in a closed state corresponds to the S3 state or the S4 state.

16. The apparatus of claim 13, wherein the BIOS module performs a booting process for operating the operating system, when the system status corresponding to a case when the cover is in a closed state corresponds to the S5 state.

17. The apparatus of claim 12, wherein the sensing unit is configured to further detect an opening angle of the cover when the cover is in an open state, and
   wherein the BIOS module performs a predetermined operation in accordance with the configuration value being stored in the ROM section, based upon a system status corresponding to when the cover is in a closed state, only when the detected opening angle of the cover is equal to or greater than a predetermined angle.

18. The apparatus of claim 12, wherein the sensing unit is configured to further detect an opening angle of the cover when the cover is in an open state, and
   wherein, after performing the predetermined operation, the BIOS module returns to a system status corresponding to when the cover is in a closed state, when the detected opening angle of the cover is equal to or greater than the predetermined angle.

19. The apparatus of claim 12, further comprising:
   a control unit,
   wherein the sensing unit comprises a fingerprint recognition sensor configured to recognize a fingerprint when the cover is in a closed state, and
   wherein, after the operating system is being operated, the control unit provides a user environment respective to the fingerprint recognition result.

20. The apparatus of claim 12, wherein, after an opening of the cover is detected, when a closing of the cover is detected within a predetermined period of time, the BIOS module returns to a system status corresponding to a case when the cover is in a closed state, prior to detecting the opening of the cover.

* * * * *